UNITED STATES PATENT OFFICE.

EDWARD C. BRICE, OF WASHINGTON, DISTRICT OF COLUMBIA.

ARTIFICIAL STONE.

SPECIFICATION forming part of Letters Patent No. 449,067, dated March 24, 1891.

Application filed January 4, 1890. Serial No. 335,907. (No specimens.)

*To all whom it may concern:*

Be it known that I, ELWARD C. BRICE, of Washington, in the District of Columbia, have invented a new and useful Improvement in Artificial Stone; and I do hereby declare that the following is a full, clear, and exact description of the same.

My invention is an improvement in the manufacture of bricks, artificial stone for use in pavements, buildings, and for such other purposes as those in which natural stone or burned brick is used.

The invention consists in the process of manufacture.

In carrying out my invention I take of clear sand, such as the ordinary sand composed mainly of silex, fifteen parts, by measure, eight parts of lime, by measure, and eight parts, by measure, of caustic soda. These substances are mixed together and placed in a furnace suitable for the purpose, and thereafter the furnace is brought up to a heat of about 800° Fahrenheit. I then blow into the furnace and into contact with the heated materials above specified fumes rising from the solution of common salt in sulphuric acid. As soon as the materials above specified have been reduced to a semi-liquid condition by means of heat and with the application of the fumes above mentioned, it is drawn off from the furnace and thinned by the addition of warm water in the proportion of three gallons of water to one of the semi-liquid material. I then take of finely-pulverized dry clay and of Portland cement in the proportion of two ounces of the cement and five pounds six ounces of the clay and mix these thoroughly together. This mixture of clay and cement is then stirred into the diluted mixture of sand, lime, and soda until it is of a proper consistency to mold, and the resultant mass may be rolled out into sheets or pressed into the form of tiles, building-bricks, or blocks of any suitable shape desired, and it then sets or hardens and is ready for use. It may be laid directly by rolling it in the form of sheets for sidewalks, floors, and the like without forming it into blocks.

I claim as my invention—

The hereinbefore-described mode of making artificial stone, the same consisting, first, in reducing sand, lime, and caustic soda to a liquid condition by the application of heat and the fumes of common salt dissolved in sulphuric acid; next, in thinning the semi-liquid material by the addition of water; third, in mixing therewith clay and Portland cement, all substantially as described.

In testimony whereof I have signed my name to this specification in the presence of two subscribing witnesses.

EDWARD C. BRICE.

Witnesses:
 HENRY E. COOPER,
 I. E. MIDDLETON.